(12) United States Patent
Fujiyama

(10) Patent No.: US 6,292,861 B1
(45) Date of Patent: Sep. 18, 2001

(54) PROCESSOR HAVING INTERFACE WITH BUS ARBITRATION CIRCUIT

(75) Inventor: Hiroyuki Fujiyama, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/294,340

(22) Filed: Apr. 20, 1999

(30) Foreign Application Priority Data

Apr. 30, 1998 (JP) .................................................. 10-121083

(51) Int. Cl.$^7$ .......................... G06F 13/364; G06F 13/20; G06F 13/42
(52) U.S. Cl. ............................ 710/112; 710/129; 710/63; 710/105; 711/211
(58) Field of Search .................................. 710/126, 220, 710/117, 129, 116, 128, 110, 112, 37, 27, 26, 105, 63, 39, 61; 713/401; 711/167, 211, 209; 709/202, 201; 712/38, 39, 37, 36, 29, 30

(56) References Cited

U.S. PATENT DOCUMENTS 4,807,109 * 2/1989 Farrell et al. ........................ 713/401
5,239,631 * 8/1993 Boury et al. ........................ 710/117

* cited by examiner

Primary Examiner—Daniel H. Pan
(74) Attorney, Agent, or Firm—Staas & Halsey LLP (57) ABSTRACT

A processor 11A comprises a processor core 11 connected to an internal bus 14, an interface circuit 12 connected between the internal bus 14 and an external bus 22, and an interface circuit 13 connected between the internal bus 14 and an external bus 24. To simplify bus arbitration, the interface circuit 12 holds an address on the internal bus 14 in an first address buffer register 121 in response to an internal address strobe signal *ASi, judges based on the address value whether or not an access request is performed, outputs a bus request signal *PREQ, outputs the content of the first address register 121 onto the external bus 22 after getting a bus ownership, thereafter provides the data on the external bus 22 to the internal bus 14, and provides an internal ready signal *RDYi to the processor core 11. The processor may comprise a between-interface control circuit to enable to connect between the external circuits 22 and 24 in common.

9 Claims, 9 Drawing Sheets

PROCESSOR HAVING INTERFACE WITH BUS ARBITRATION CIRCUIT

BACKGROUND OF THE INVENTION

1. Field of the Invention

The present invention relates to a processor having an interface with a bus arbitration circuit and a data processing apparatus using the same.

2. Description of the Related Art

Figure 8:
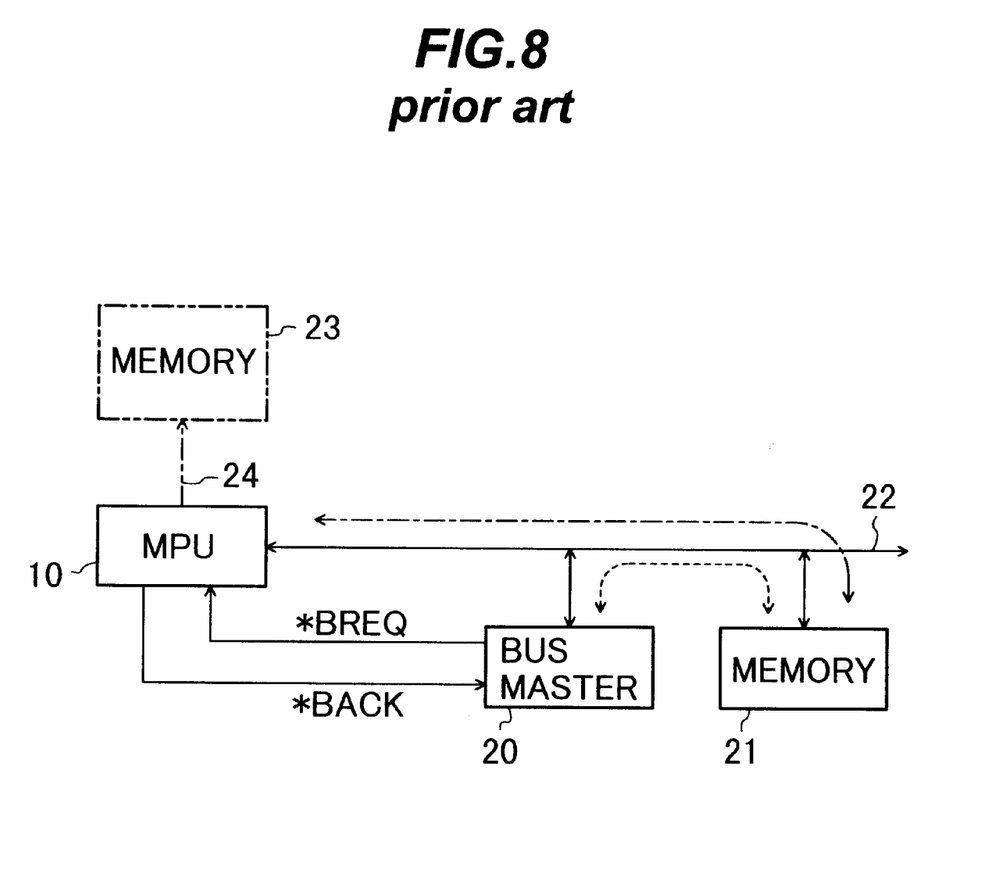
FIG. 8 is a block diagram showing a prior art data processing apparatus.
Figure 9:
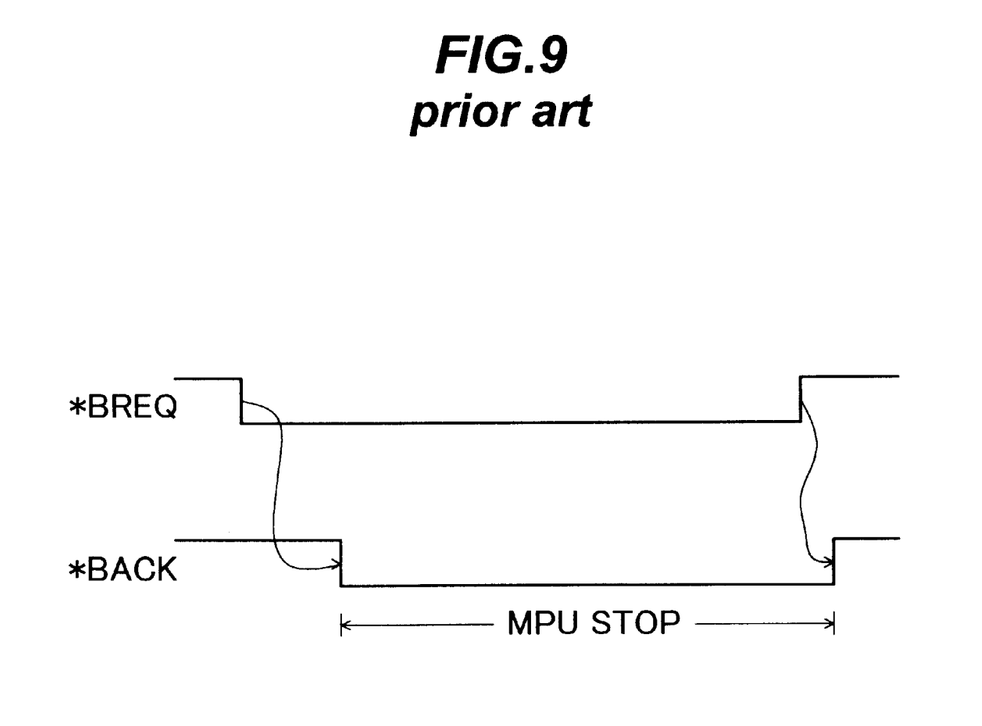
FIG. 9 is a timing chart showing a bus ownership arbitrating operation of the apparatus of FIG. 8.

FIG. 8 shows a prior art data processing apparatus consisting of a microprocessor 10, a buss master 20, for example, a DMA controller, a memory 21 and an external bus 22 connected therebetween. FIG. 9 is a timing chart showing arbitrating signals of a bus ownership between the microprocessor 10 and the bus master 20. An asterisk '*' attached to reference character for signal means that the signal is active when it is low.

The bus master 20 makes the bus request signal *BREQ low when it is going to use the external bus 22. In response thereto, the microprocessor 10 relinquishes the external bus 22 by setting the output of the microprocessor 10, to which the external bus 22 is connected, to a high impedance state after the microprocessor 10 completes execution of its present instruction, and make an acknowledge signal *BACK high to give the bus master 20 notice of the bus master 20 having being relinquished. In response thereto, the bus master 20 accesses the contents of the memory 21. Upon completion of the access, the bus master 20 relinquishes the external bus 22 by setting the output of the bus master 20, to which the external bus 22 is connected, to a high impedance state and make the bus request signal *BREQ high to give the microprocessor 10 notice of the bus master 20 having being relinquished.

Even if a memory 23 is connected to the microprocessor 10 via an external bus 24 independent of the external bus 22, operation of the microprocessor 10 stops accessing while the acknowledge signal *BACK is low. Therefore, the microprocessor 10 can not get access to the memory 23, and the throughput of a data processing apparatus is lowered. In order to improve the throughput, if bus arbiter regarding the external bus 24 is performed, the control and configuration of the microprocessor 10 becomes complicated.

SUMMARY OF THE INVENTION

Accordingly, an object of the present invention is to provide a processor whose bus ownership arbitrating control is simple even though a plurality of buses are provided, and a data processing apparatus using the same.

In the 1st aspect of the present invention, there is provided a processor comprising: a processor core (11) connected to an internal bus (14); a first interface circuit (12) connected between the internal bus and a first bus (22); and a second interface circuit (13) connected between the internal bus and a second bus (23), wherein the first interface circuit, comprising a first address buffer register (121), holds an address on the internal bus in the first address buffer register in response to a read request from the processor core, outputs the content of the first address buffer register onto the first bus when having a bus ownership for the first bus, thereafter provides data on the first bus onto the internal bus, and provides an internal ready signal (*RDYi) through the internal bus to the processor core, wherein the second interface circuit, comprising a second address buffer register (131), holds an address on the internal bus in the second address buffer register in response to a read request from the processor core, outputs the content of the second address buffer register onto the second bus, thereafter provides data on the second bus onto the internal bus, and provides an internal ready signal (*RDYj) through the internal bus to the processor core.

With the 1st aspect of the present invention, since the processor core does not need to perform any bus arbitration, the read operation of the processor core through the 1st bus is the same as that through the 2nd bus, and the bus ownership arbitrating operation is needed only between the 1st interface circuit and a bus master connected to the 1st bus, the bus ownership arbitrating control can be simple.

In the 2nd aspect of the present invention, there is provided a processor as defined in the 1st aspect, wherein each of the read request from the processor core to the first or second interface circuit is a combination of an internal address strobe signal (*ASi) and the address.

With the 2nd aspect of the present invention, no special read request signal is required.

In the 3rd aspect of the present invention, there is provided a processor as defined in the 2nd aspect, wherein the first interface circuit comprises a status circuit which stores an idle state when there is no read request signal from the processor core thereto, the first state from receipt of the read request signal until getting a bus ownership for the first bus, and the second state from getting of the bus ownership for the first bus until completing a read operation through the first bus, the first interface circuit performing a bus arbitration depending on the stored state of the status circuit.

With the 3rd aspect of the present invention, since the bus arbitration is carried out depending on the present state, the bus arbitrating control can be simple.

In the 4th aspect of the present invention, there is provided a processor as defined in the 3rd aspect, wherein the first interface circuit (12), in the idle state: outputs an acknowledge signal (*BACK) to relinquish a bus ownership of the first bus in response to a bus request signal (*BREQ) from the outside; and holds an address on the internal bus in the first address buffer register in response to the internal address strobe signal (*ASi).

In the 5th aspect of the present invention, there is provided a processor as defined in the 4th aspect, wherein the first interface circuit outputs a bus request signal (*PREQ) in the first state.

In the 6th aspect of the present invention, there is provided a processor as defined in the 5th aspect, wherein the first interface circuit further comprises a data buffer register and in the second state: outputs the content of the first address buffer register on the first bus; outputs an external address strobe signal (*ASo); holds data on the first bus in the data buffer register in response to an external ready signal (*RDYo); outputs the content thereof to the internal bus; and thereafter provides the internal ready signal (*RDYi) to the processor core.

In the 7th aspect of the present invention, there is provided a processor as defined in the 6th aspect, further comprising a between-interface control circuit (16) for transmitting the bus request signal (*BREQ) to the first interface circuit in response to the bus request signal from the outside, if the first and second buses are connected in common to each other then in an idle state of the second interface circuit, or else unconditionally.

With the 7th aspect of the present invention, by adding the between-interface control circuit of a simple configuration, it is possible for users of the processors to select whether the 2nd bus is used independent of the 1st bus or the both of them are connected in common, according to respective uses. Thereby, depending upon a use, it is possible to simplify the configuration of a data processing apparatus employing the processor.

In the 8th aspect of the present invention, there is provided a processor as defined in the 7th aspect, further comprising an input terminal of a mode signal for indicating whether or not the first and second buses are connected in common to each other.

With the 8th aspect of the present invention, a common connection detecting circuit is not required.

In the 9th aspect of the present invention, there is provided a processor as defined in the 6th aspect, wherein the first and second buses are connected in common to each other internally, the processor further comprises a between-interface control circuit (16A) for, when the second interface circuit is in the idle state, transmitting the bus request signal to the first interface circuit in response to the bus request signal from the outside.

With the 9th aspect of the present invention, the number of external terminals can be reduced.

In the 10th aspect of the present invention, there is provided a data processing apparatus, comprising a processor including: a processor core (11) connected to an internal bus (14); a first interface circuit (12) connected between the internal bus and a first bus (22); and a second interface circuit (13) connected between the internal bus and a second bus (23); wherein the first interface circuit, comprising a first address buffer register (121), holds an address on the internal bus in the first address buffer register in response to a read request from the processor core, outputs the content of the first address buffer register onto the first bus when having a bus ownership for the first bus, thereafter provides data on the first bus onto the internal bus, and provides an internal ready signal (*RDYi) through the internal bus to the processor core, wherein the second interface circuit, comprising a second address buffer register (131), holds an address on the internal bus in the second address buffer register in response to a read request from the processor core, outputs the content of the second address buffer register onto the second bus, thereafter provides data on the second bus onto the internal bus, and provides an internal ready signal (*RDYj) through the internal bus to the processor core, the data processing apparatus, further comprising: a first memory connected to the first bus; a bus master, connected to the first bus, for getting access to the first memory with arbitrating with the first interface circuit; and a second memory connected to the second bus, the operation of which is faster than that of the first memory.

Other aspects, objects, and the advantages of the present invention will become apparent from the following detailed description taken in connection with the accompanying drawings.

DESCRIPTION OF THE PREFERRED EMBODIMENTS

Referring now to the drawings, wherein like reference characters designate like or corresponding parts throughout several views, preferred embodiments of the present invention are described below. A signal which becomes active at a low will be indicated with adding * to a reference character.

First Embodiment

Figure 1:
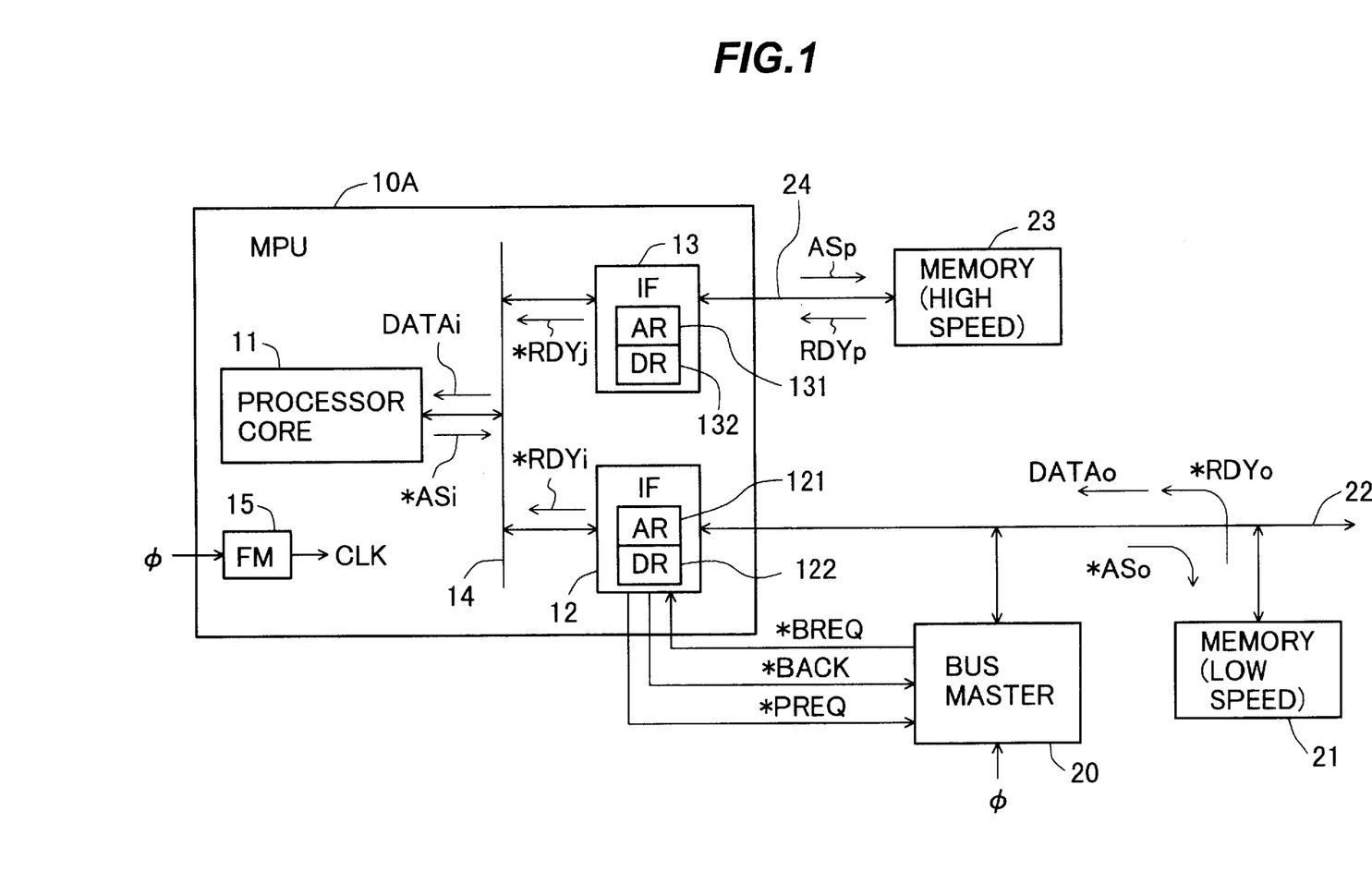
FIG. 1 is a block diagram showing a data processing apparatus according to the first embodiment of the present invention.

FIG. 1 shows a data processing apparatus according to the first embodiment of the present invention.

In the microprocessor 10A, a processor core 11, an interface circuit 12 with a bus arbitration circuit and an interface circuit 13 without a bus arbitration circuit are connected to each other through an internal bus 14. The interface circuit 12 is connected to an external bus master 20 and a memory 21 through an external bus 22, and the interface circuit 13 is connected to an external memory 23 through an external bus 24. The bus master 20 is accessible to the memory 21, and is, for example, a DMA controller. The memory 23 is, for example, an SDRAM, and its operation speed is higher than that of the memory 21. According to this, the interface circuit 13 is able to transfer data, for example, in a burst mode, and the operation speed of the interface circuit 13 is higher than that of the interface circuit 12.

For example, the apparatus of FIG. 1 is mounted within a printer, and data of character codes are stored in the memory 21 while image data for which a higher speed processing is required are stored in the memory 23.

The bus master 20 operates in synchronization with a clock φ, and the microprocessor 10A operates in synchronization with a clock CLK obtained by multiplying the frequency of the clock φ by m/n times (each of m and n is an integer) with a frequency multiplication circuit 15. It may not be necessary to provide the frequency multiplication circuit 15.

The memory 21 is accessed by the bus master 20 or microprocessor 10A. In order to avoid a signal collision on the external bus 22, bus arbitration is performed between the interface circuit 12 and the bus master 20. That is, a bus request signal *BREQ is provided from the bus master 20 to the interface circuit 12, and an acknowledge signal *BACK and a bus request signal *PREQ are provided from the interface circuit 12 to the bus master 20.

Each of the internal bus 14 and external buses 22 and 24 includes an address bus, a data bus and a control bus. The control bus of the internal bus 14 includes a signal line for providing an address strobe signal *ASi from the processor core 11 to the interface circuits 12 and 13 and a signal line for providing ready signals *RDYi and *RDYj from the interface circuits 12 and 13, respectively, to the processor core 11. The control bus of the external bus 22 includes a signal line for providing an address strobe signal *ASo from the interface circuit 12 and bus master 20 to the memory 21, and a signal line for providing a ready signal *RDYo from the memory 20 to the interface circuit 12 and bus master 20. The control bus of the external bus 24 includes a signal line for providing an address strobe signal *ASp from the interface circuit 12 to the memory 23, and a signal line for providing a ready signal *RDYp from the memory 23 to the interface circuit 13.

The interface circuits 12 is provided with an address buffer register 121 and a data buffer register 122, and likewise the interface circuits 13 is provided with an address buffer register 131 and a data buffer register 132.

Next, a description will be given of the outline of operations in a case where the processor core 11 gets access to the memory 21 or 23.

Herein assume that the memory 21 or 23 is selected when the most significant bit AH of the address is '0' or '1', respectively.

The processor core 11 does not perform any bus arbitration, and the operation of the processor core 11 for the memory 21 is the same as that for the memory 23. That is, when getting access to the memory 21 or 23, the processor core 11 outputs firstly an address onto the address bus of the internal bus 14, and at this address having been established, outputs the address strobe signal *ASi of a negative pulse. When the address strobe signal *ASi is low, the address is held in the address buffer register of the interface circuits 12 and 13 at a rise of the clock CLK. If the most significant bit AH of the held address is '0', it means that an access request is given from the processor core 11 to the interface circuit 12, whereby the interface circuit 12 escapes from an idle state, and an access operation is carried out via the interface circuit 12 between the processor core 11 and the memory 21. If AH is '1', it means that an access request is provided from the processor core 11 to the interface circuit 13, whereby the interface circuit 13 escapes from an idle state, and an access operation is performed via the interface circuit 13 between the processor core 11 and the memory 23. Therefore, at least one of the interface circuit 12 or 13 is in an idle state where no memory access exists, and no signal collision occurs on the internal bus 14 between the interface circuits 12 and 13.

Next, the operations of the interface circuit 12 will be detailed.

Figure 3:
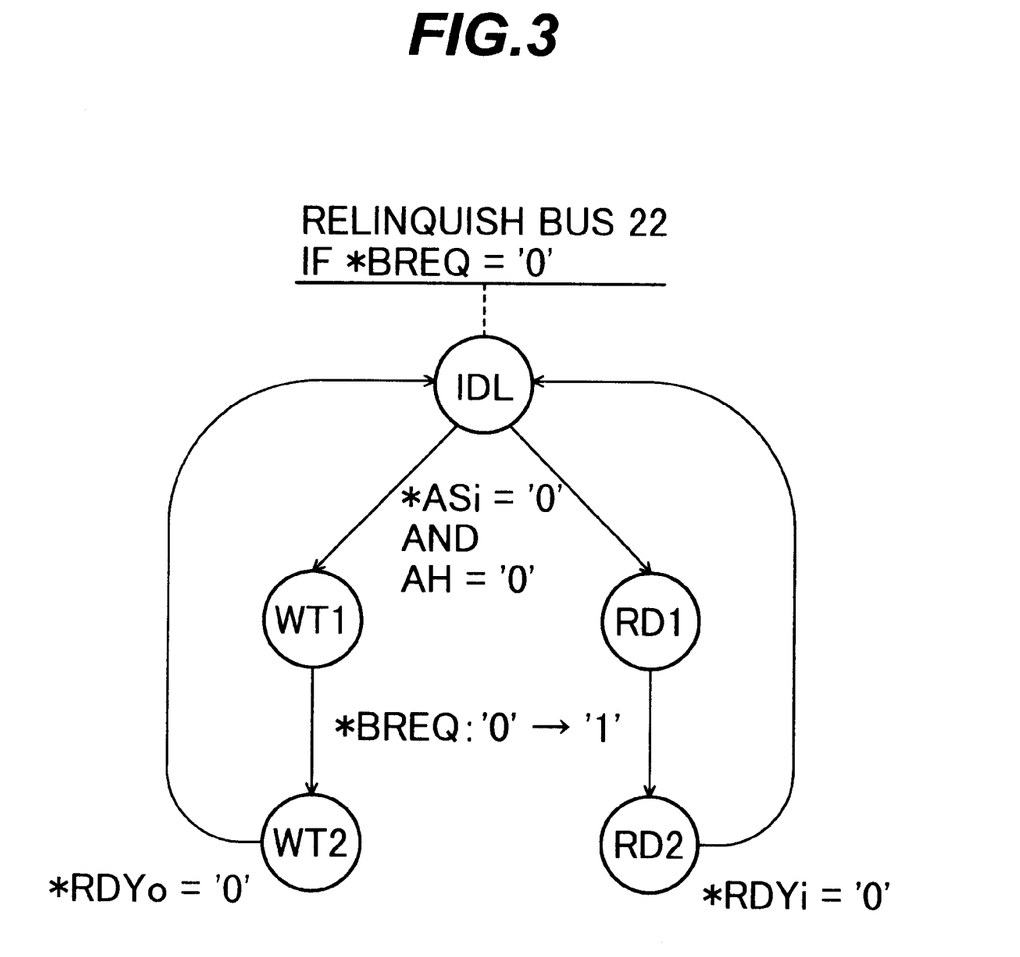
FIG. 3 is a state transition diagram of the interface circuit in FIG. 1.
Figure 4:
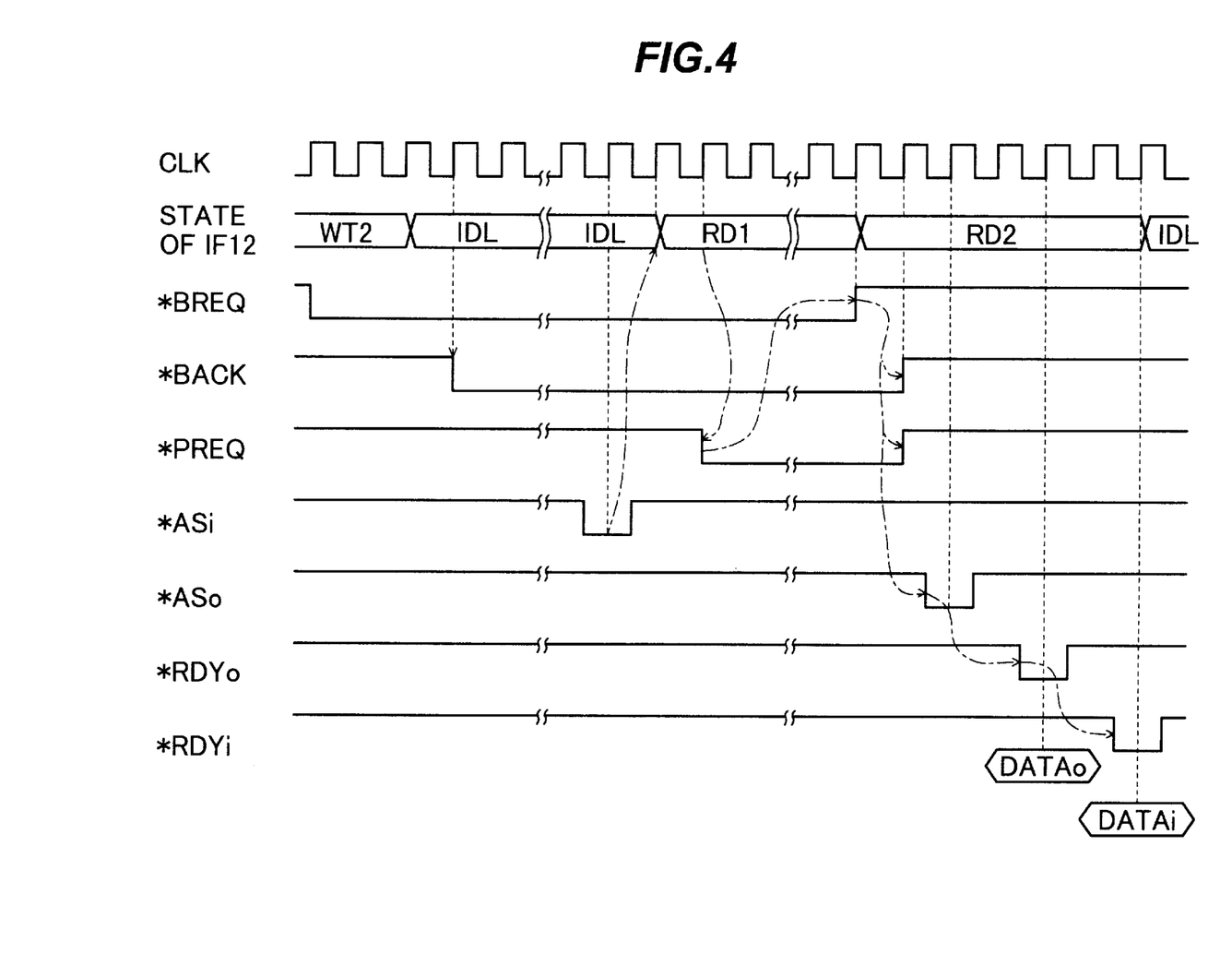
FIG. 4 is a timing chart showing a read operation of the microprocessor for a low-speed memory.

The interface circuit 12 carries out control operations depending on the present state. FIG. 3 shows changes in the state of the interface circuit 12. FIG. 4 is a timing chart showing the operations, in the apparatus of FIG. 1, of the processor core 11 to read data from the memory 21.

(1) Idle State IDL

The interface circuit 12 remains in an idle state IDL unless an access request is given from the processor core 11, namely if *ASi='1' or AH='1'. In this state, if *BREQ='0', the interface circuit 12 sets the output of the interface circuit 12, to which the external bus 22 is connected, to a high impedance state to relinquish the external bus 22 with making the acknowledge signal *BACK low, whereby the relinquishing is recognized by the bus master 20. In response thereto, the bus master 20 gets an access to the memory 21.

(2) First Read State RD1

The interface circuit 12 changes from the idle state IDL to the first read state RD1 (read preparing state) in response to a rise of the clock CLK if an access request is given from the processor core 11, namely if *ASi='0' and AH='0'. In this state, if the bus request signal *BREQ is low, that is, if the external bus 22 is being used by the bus master 20, then the interface circuit 12 makes the bus request signal *PREQ low, In response thereto, the bus master 20 relinquishes the external bus 22 by setting the output of the bus master 20, to which the external bus 22 is connected, to a high impedance state after completing the present access operation, and makes the bus request signal *BREQ high to give the interface circuit 12 notice of the bus 22 having been relinquished.

(3) Second Read State RD2

Receiving this notice, the interface circuit 12 changes from the first read state RD1 to the second read state RD2 (reading state), and starts to get access to the memory 21. That is, the interface circuit 12 makes the acknowledge signal *BACK high at a rise of the clock CLK to give the bus master 20 notice of the external bus 22 being on use. At the same time, the interface circuit 12 sets the bus request signal *PREQ to a high, and enables the output of the address buffer register 121 from a high impedance state. Thereby, an address ADRo outputted from the address buffer register 121 is provided to the memory 21 via the external bus 22. The interface circuit 12 outputs the address strobe signal *ASo of a negative pulse.

The memory 21 holds the address ADRo at a rise of the clock CLK when the address strobe signal *ASo is low, and starts a reading operation. From the memory 21, data DATAo is read and the ready signal *RDYo of a negative pulse is outputted.

The interface circuit 12 holds data on the data bus of the external bus 22 in the data buffer register 122 at a rise of the clock CLK when the ready signal *RDYo is low. The output of the data buffer register 122 is taken out onto the data bus of the internal bus 14. The interface circuit 12 outputs the ready signal *RDYi of a negative pulse to the processor core 11.

The processor core 11 holds data on the internal bus 14 at a rise of the clock CLK when the *RDYi is low, thereby completing a read operation of the processor core 11 for the memory 21. At this rise, the interface circuit 12 returns to an idle state IDL.

In FIG. 3, in the case of a write operation, the first and second write state WT1 and WT2 correspond to the first and second read state RD1 and RD2, respectively. The transient conditions from the idle state IDL to the first write state WT1 and therefrom to the second write state WT2 are the same as those from the idle state IDL to the first read state RD1 and therefrom to the second read state RD2. The transient condition from the second write state WT2 to the idle state IDL is to detect that the ready signal *RDYo is low, which means the memory 21 have received data. The ready signal *RDYi is provided, in the first write state WT1, from the interface circuit 12 to the processor core 11 when the interface circuit 12 have received data from the processor core 11.

The operations in the interface circuit 13 are the same as those in the interface circuit 12, excluding a bus arbitrating operation between the interface circuit 12 and the bus master 20 and the operation speed.

According to the first embodiment, it is enough only that the processor core 11 carries out usual operations without making any bus arbiter and a bus arbitrating operation is carried out between the interface circuit 12 and the bus master 20, whereby the bus arbitrating control, between the microprocessor 10A provided with independent external buses 22 and 24 and the external circuits, can be simplified.

Figure 2:
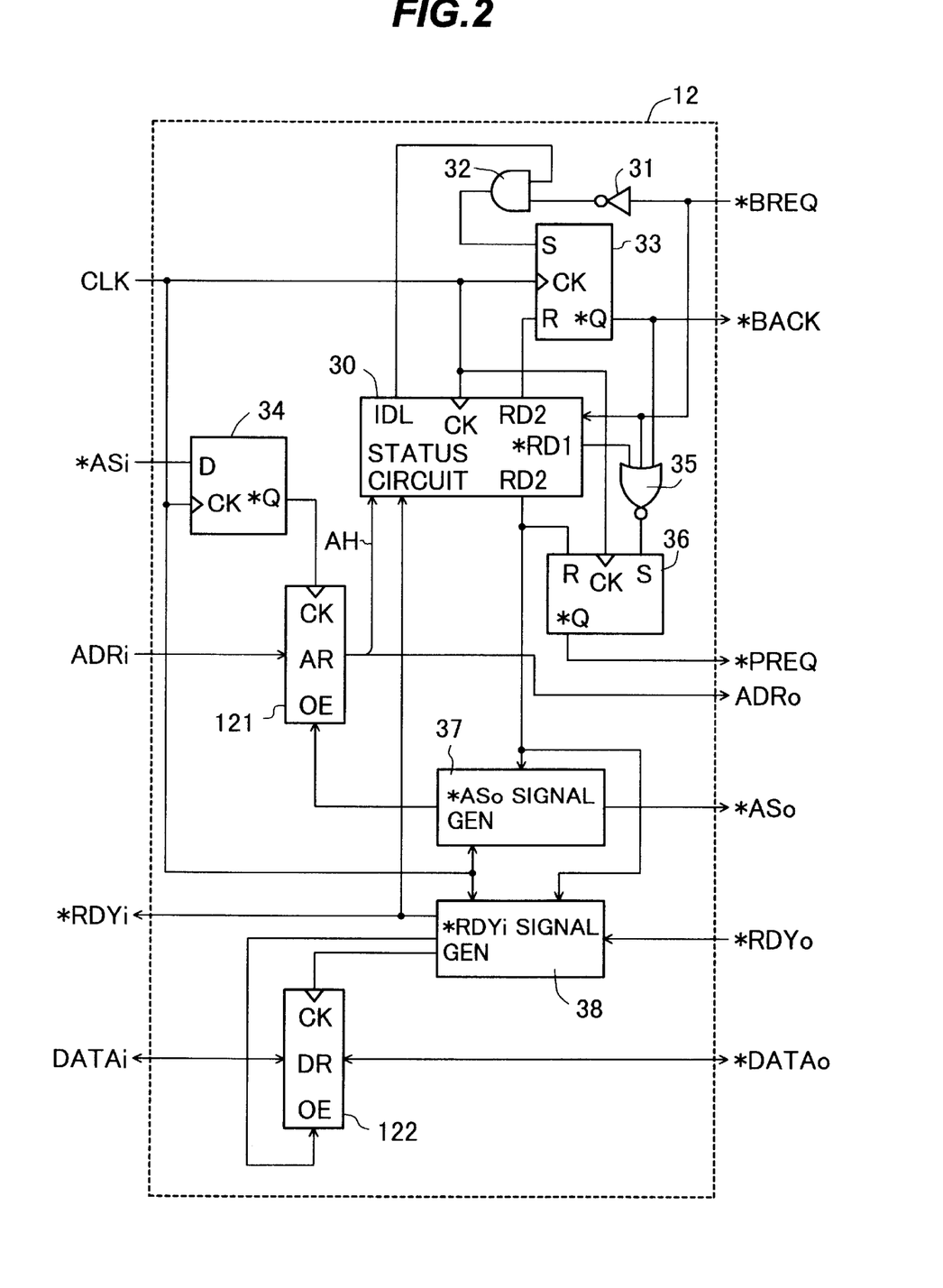
FIG. 2 is a diagram showing an embodiment of the interface circuit in FIG. 1.

FIG. 2 shows an embodiment regarding read operations of the interface circuit 12.

The states of FIG. 3 are set in a status circuit 30 provided with flip-flops for holding the states. The state output of the status circuit 30 is IDL='1', *RD1='1', and RD2='0' in the idle state, IDL='0', *RD1='0', and RD2='0' in the first read state, and IDL='0', *RD1='1', and RD2='1' in the second read state.

The bus request signal *BREQ is provided to one of the inputs of an AND gate 32 via an inverter 31, and an idle state signal IDL is provided from the status circuit 30 to the other input of the AND gate 32. The output of the AND gate 32 is provided to the set input S of a synchronization type RS flip-flop 33, and the second read state signal RD2 of the status circuit 30 is provided to the reset input R of the RS flip-flop 33 whose non-inversion output Q provides the bus request signal *BREQ.

Therefore, in a case where *BREQ='0' and IDL='1', the output of the AND gate 32 becomes '1', and the acknowledge signal *BACK changes to low at a rise of the clock CLK. When RD2='1', the acknowledge signal *BACK changes to high at a rise of the clock CLK.

The address strobe signal *ASi is provided to the data input D of a D flip-flop 34, and the inversion output *Q of the D flip-flop 34 is connected to the clock input CK of the address buffer register 121.

Therefore, when the address strobe signal *ASi is low, the address ADRi is held in the address buffer register 121 at a rise of the clock CLK.

The most significant bit AH of the held address is provided to the status circuit 30. If IDL='1' and AH='0', the status circuit 30 becomes the first read state, namely IDL='0' and *RD1='0', at a rise of the clock CLK.

A NOR gate 35 receives the bus request signal *BREQ, acknowledge signal *BACK and first read state signal *RD1, and its output is provided to the set input S of an RS flip-flop 36. The reset input of the RS flip-flop 36 receives the second read state signal RD2 from the status circuit 30. The inverted output *Q of the RS flip-flop 36 provides the bus request signal *PREQ.

Therefore, if *BREQ='0', *BACK='0', and *RD1='0', then the bus request signal *PREQ changes to low at a rise of the clock CLK. If *RD1='0', then the status circuit 30 changes to the second read state, namely *RD1='1' and RD2='1', at a rise of the bus request signal *BREQ. After RD2='1', the bus request signal *PREQ returns to a high at a rise of the clock CLK.

A *ASo signal generating circuit 37 keeps an output enable signal OE to the address buffer register 121 high during a given period of time in response to the transition of the second read state signal RD2 to '1', whereby the output of the address buffer register 121 becomes effective from a high impedance state. This output is provided to the memory 21 through the external bus 22. Next, the *ASo signal generating circuit 37 outputs the address strobe signal *ASo of a negative pulse.

A *RDYi signal generating circuit 38 causes the data buffer register 122 to hold data DATAo at a rise of the clock CLK when RD2='1' and *RDYo='0', keeps an output enable signal OE to the register 122 high in a given period of time, and outputs a ready signal *RDYi which is generated by delaying the ready signal *RDYo for two clock cycles.

According to the first embodiment described above, it can be comparatively simple to construct the bus arbitration circuit in the microprocessor 10A provided with the independent external buses 22 and 24.

Second Embodiment

Figure 5:
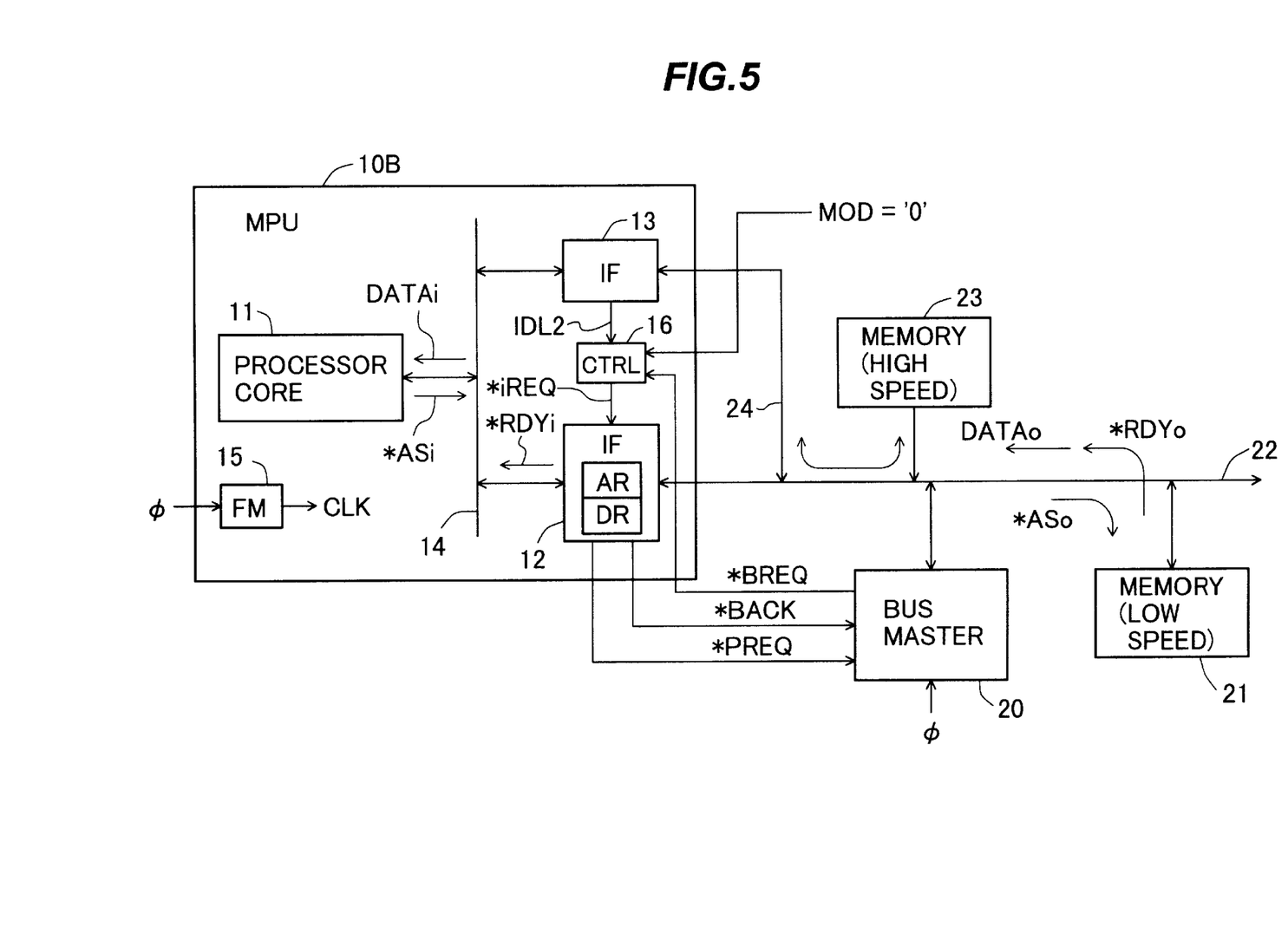
FIG. 5 is a block diagram showing a data processing apparatus according to the second embodiment of the present invention.

FIG. 5 shows a data processing apparatus according to the second embodiment of the present invention.

In order to simplify data processing apparatus according to uses of users, a microprocessor 10B enables to connect the external bus 24 to the external bus 22 in common. To enable this, the microprocessor 10B is provided with the input of a mode signal MOD and a between-interface control circuit 16. When using this common connection, MOD='0' is set, and when the independent connection like FIG. 1 is used, MOD='1' is set.

Figure 6A:
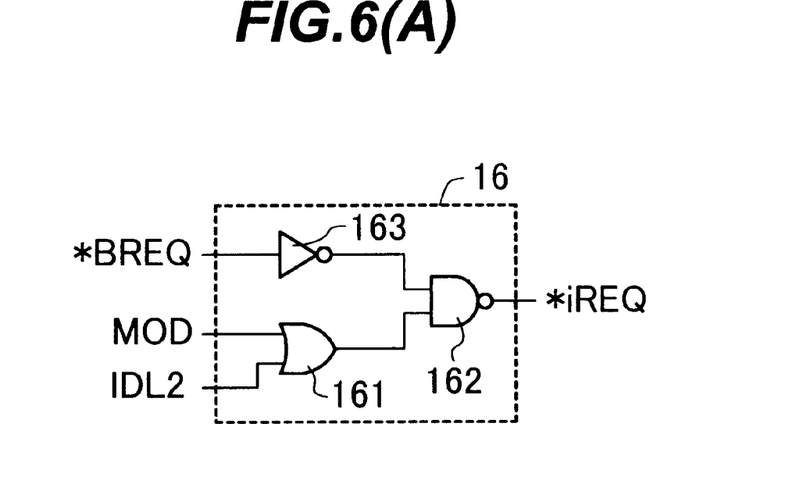
FIG. 6(A) is a diagram showing an embodiment of a between-interface control circuit in FIG. 5.
Figure 6B:
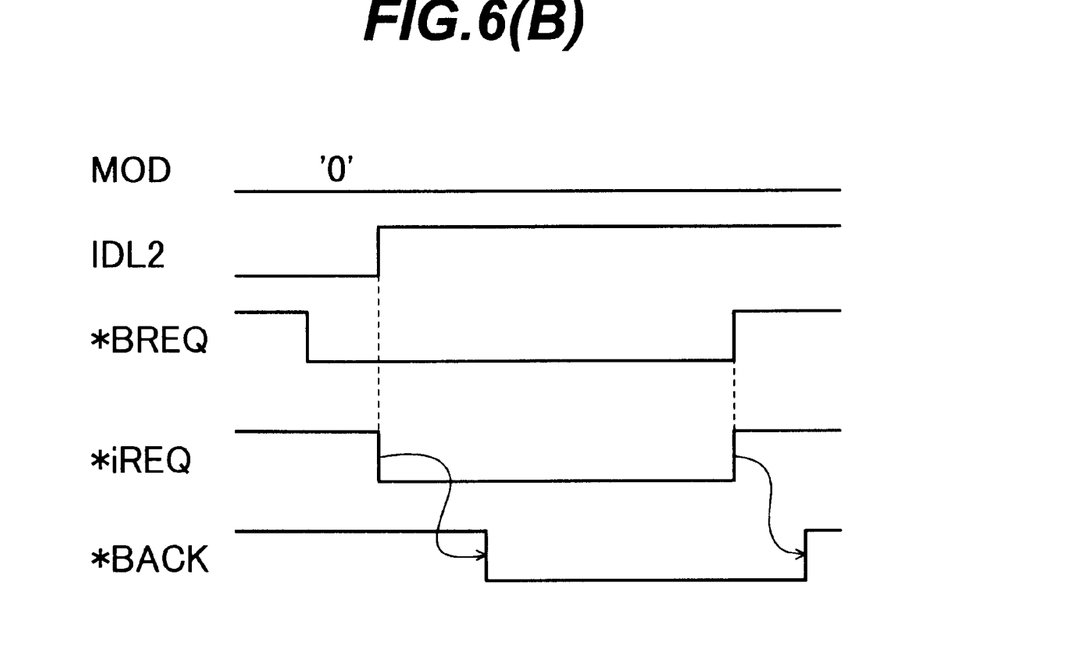
FIG. 6(B) is a timing chart showing operations thereof.

FIG. 6(A) shows an embodiment of the between-interface control circuit 16, and FIG. 6(B) shows a timing chart of operations thereof;

An idle state signal IDL2 is '1' if the interface circuit 13 is in the idle state, or else IDL2 is '0'. The mode signal MOD and the idle state signal IDL2 are provided to an OR gate 161 whose output is provided to one input of a NAND gate 162. To the other input of the NAND gate 162, the bus request signal *BREQ is provided through an inverter 163. The bus request signal *iREQ from the NAND gate 162 is provided to the interface circuit 12 in FIG. 5. The interface circuit 12 uses this signal *iREQ instead of the bus request signal *BREQ in FIG. 1.

All other points of the second embodiment are identical to those of the above-described first embodiment.

Since *iREQ becomes identical to *BREQ when MOD='1', operations which are the same as those of the circuit of FIG. 1 are carried out.

As shown in FIG. 6(B), when MOD='0', if the idle state signal IDL2 is '0', that is, if the processor core 11 is getting access to the memory 23 at a high speed via the interface circuit 13, then the bus request signal *iREQ is '0' independent of the bus request signal *BREQ. Therefore, the bus request signal *BREQ coming from the bus master 20 is not transmitted to the interface circuit 12. If IDL2 becomes '1' after the high speed access is completed, *iREQ becomes identical to *BREQ, whereby the bus request signal *BREQ from the bus master 20 becomes visible from the interface circuit 12, and operations which are the same as those in the above-described first embodiment are carried out.

According to the 2nd embodiment, by adding the between-interface control circuit 16 of simple configuration to the microprocessor 10A in FIG. 1, it becomes possible for users of the microprocessors 10B to select whether the external bus 24 is used independent of the external bus 22 or the both of them are connected in common, according to respective uses. Thereby, depending upon the uses, it is possible to simplify the configuration of a data processing apparatus using the microprocessor 10B.

Note that it may be configured in the microprocessor 10B so that the mode signal MOD is automatically generated by detecting the common connection between the external buses 22 and 24 without comprising the input of the mode signal MOD.

Third Embodiment

Figure 7:
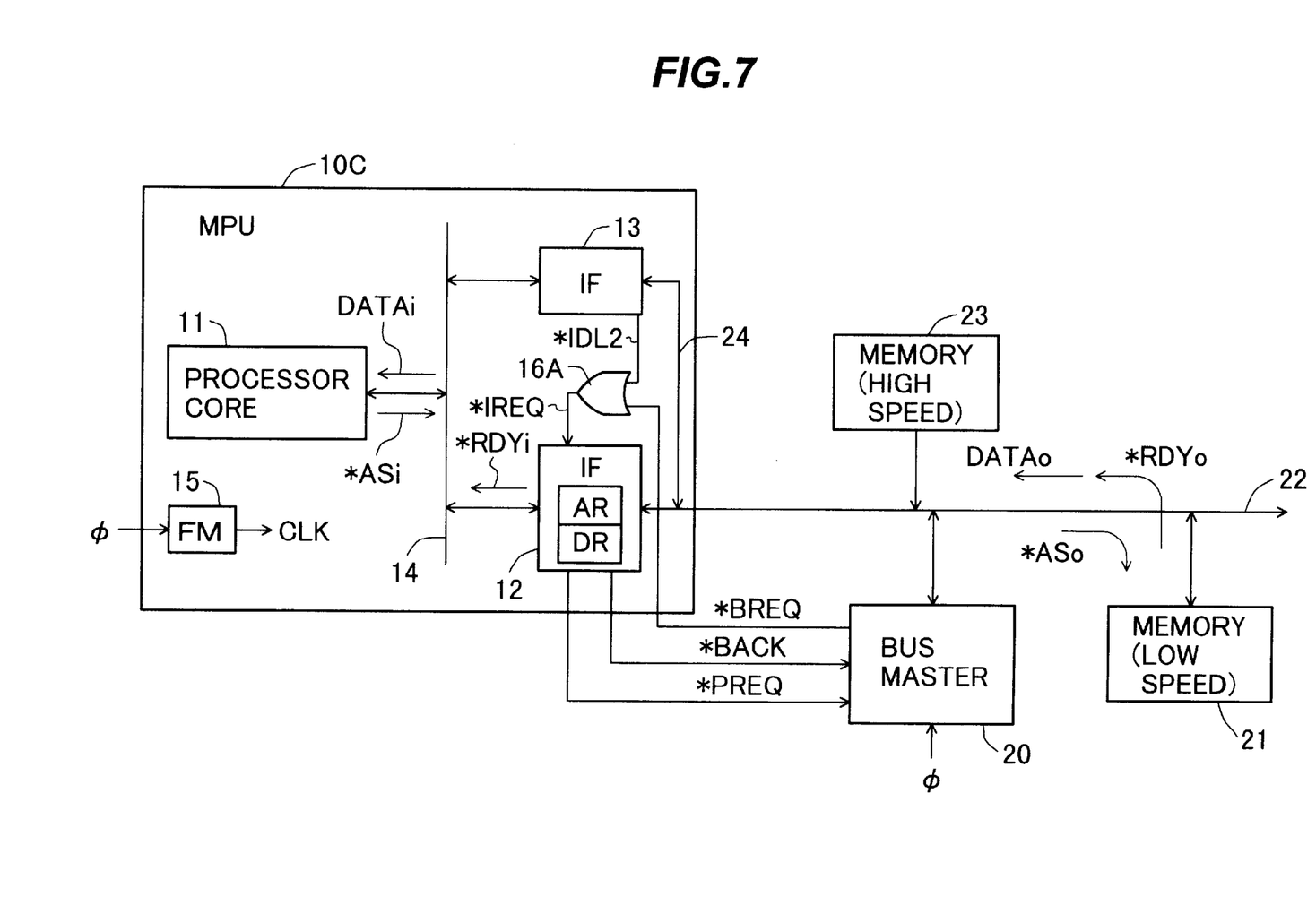
FIG. 7 is a block diagram showing a data processing apparatus according to the third embodiment of the present invention.

FIG. 7 shows a data processing apparatus according to the third embodiment of the present invention.

In order to decrease the number of external terminals, the buses 24 and 22 are connected in common to each other in the microprocessor 10C. In this case, since it is not possible to select common or independent connection as in the above-described second embodiment, no mode signal is required. An OR gate 16A is used as a between-interface circuit.

If *IDL2='1', that is, in a case where the processor core 11 gets access to the memory 23 at a high speed via the interface circuit 13, then *iREQ='1' independent of the bus request signal *BREQ. Therefore, *BREQ from the bus master 20 is not transmitted to the interface circuit 12. If *IDL2='0' after completion of this high speed access, then *iREQ becomes identical to *BREQ, whereby *BREQ from the bus master 20 becomes visible from the interface circuit 12, and operations which are the same as those in the above-described first embodiment are carried out.

All the other points of the third embodiment are identical to those in the above-described second embodiment.

Although preferred embodiments of the present invention has been described, it is to be understood that the invention is not limited thereto and that various changes and modifications may be made without departing from the spirit and scope of the invention.

What is claimed is:

1. A processor comprising:

a processor core connected to an internal bus;

a first interface circuit connected between the internal bus and a first bus; and a second interface circuit connected between the internal bus and a second bus, wherein said first interface circuit comprises a first address buffer register and holds an address on the internal bus in said first address buffer register in response to a read request from said processor core, outputs content of said first address buffer register to the first bus when comprising a bus ownership for the first bus and provides data on the first bus to the internal bus, and provides an internal ready signal through the internal bus to said processor core, and wherein said second interface circuit comprises a second address buffer register and holds an address on the internal bus in said second address buffer register in response to a read request from said processor core, outputs content of said second address buffer register to the second bus and provides data on the second bus to the internal bus, and provides an internal ready signal through the internal bus to said processor core, wherein each of the read request from said processor core to said first or second interface circuit is a combination of an internal address strobe signal and the address in said first or second address buffer register, respectively.

2. The processor according to claim 1, wherein said first interface circuit comprises a status circuit storing an idle state when there is no read request signal from said processor core thereto, a first state from receipt of the read request signal until getting a bus ownership for the first bus, and a second state from getting of the bus ownership for the first bus until completing a read operation through the first bus, said first interface circuit performing a bus arbitration depending on the stored state of said status circuit.

3. The processor according to claim 2, wherein said first interface circuit, in said idle state outputs an acknowledge signal to relinquish the bus ownership of the first bus in response to a bus request signal, and holds an address on the internal bus in said first address buffer register in response to the internal address strobe signal.

4. The processor according to claim 3, wherein said first interface circuit outputs a bus request signal in said first state.

5. The processor according to claim 4, wherein said first interface circuit further comprises a data buffer register and in said second state outputs content of said first address buffer register to the first bus; outputs an external address strobe signal; holds data on the first bus in said data buffer register in response to an external ready signal; outputs content of said data buffer register to the internal bus; and provides the internal ready signal to said processor core.

6. The processor according to claim 5, further comprising a between-interface control circuit for transmitting the bus request signal to said first interface circuit in response to the bus request signal, if the first and second buses are connected in common to each other then in an idle state of said second interface circuit, or else unconditionally.

7. The processor according to claim 6, further comprising an input terminal of a mode signal indicating whether or not the first and second buses are connected in common to each other.

8. The processor according to claim 5, wherein the first and second buses are connected in common to each other internally, said processor further comprises a between-interface control circuit transmitting the bus request signal to said first interface circuit in response to the bus request signal when said second interface circuit is in the idle state.

9. A data processing apparatus, comprising a processor including:

a processor core connected to an internal bus;

a first interface circuit connected between the internal bus and a first bus;

a second interface circuit connected between the internal bus and a second bus, wherein said first interface circuit comprises a first address buffer register and holds an address on the internal bus in said first address buffer register in response to a read request from said processor core, outputs content of said first address buffer register to the first bus when comprising a bus ownership for the first bus and provides data on the first bus to the internal bus, and provides an internal ready signal through the internal bus to said processor core, wherein said second interface circuit comprises a second address buffer register and holds an address on the internal bus in said second address buffer register in response to a read request from said processor core, outputs content of said second address buffer register to the second bus and provides data on the second bus to the internal bus, and provides an internal ready signal through the internal bus to said processor core;

a first memory connected to the first bus;

a bus master, connected to the first bus, accessing said first memory with arbitrating with said first interface circuit; and a second memory connected to the second bus and operating faster than said first memory.

* * * * *